Oct. 12, 1926.
L. D. SOUBIER
1,603,160
MEANS FOR FORMING CHARGES OF MOLTEN GLASS
Filed June 1, 1920    4 Sheets-Sheet 1
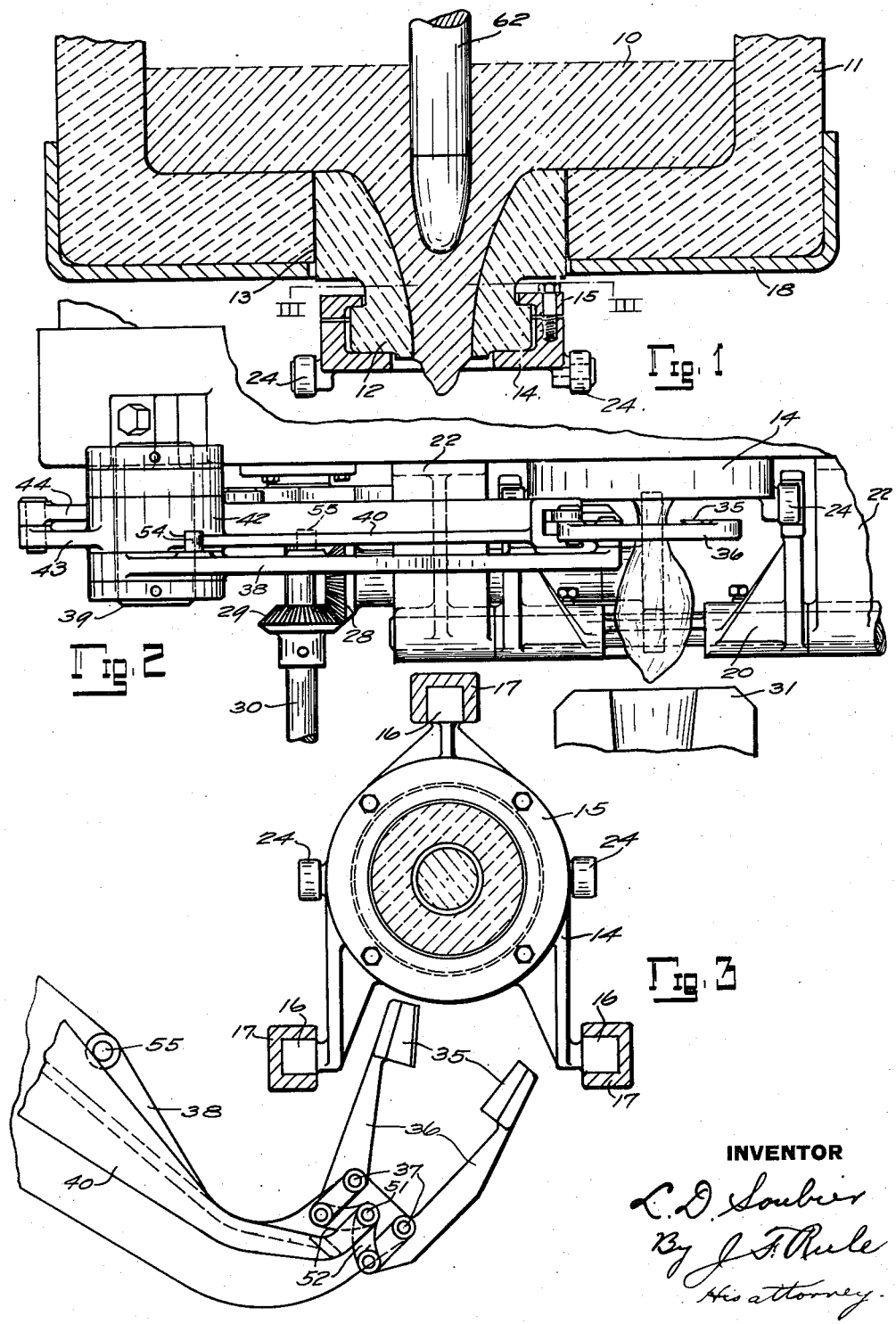
INVENTOR
L. D. Soubier
By J. F. Rule
His attorney.

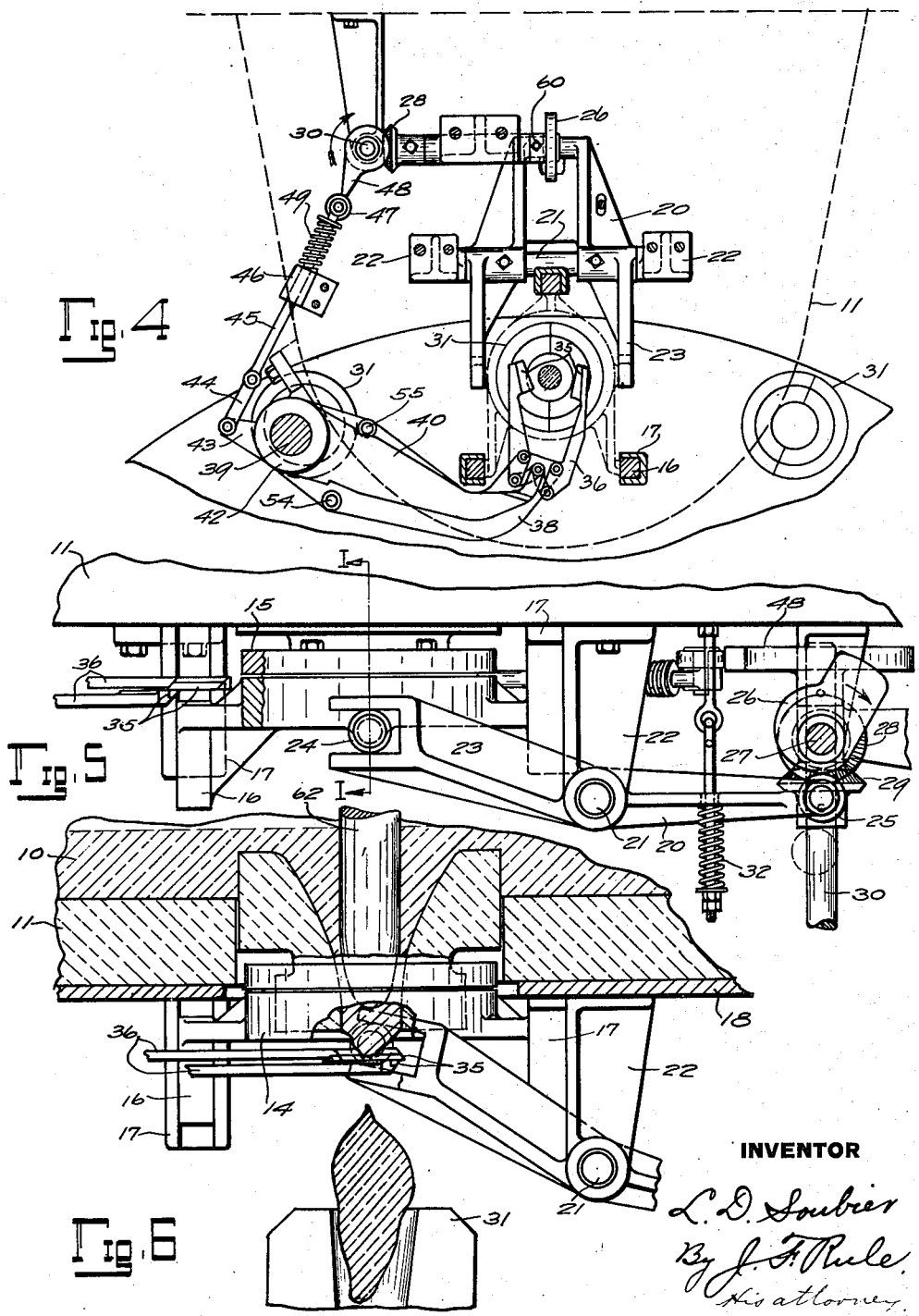

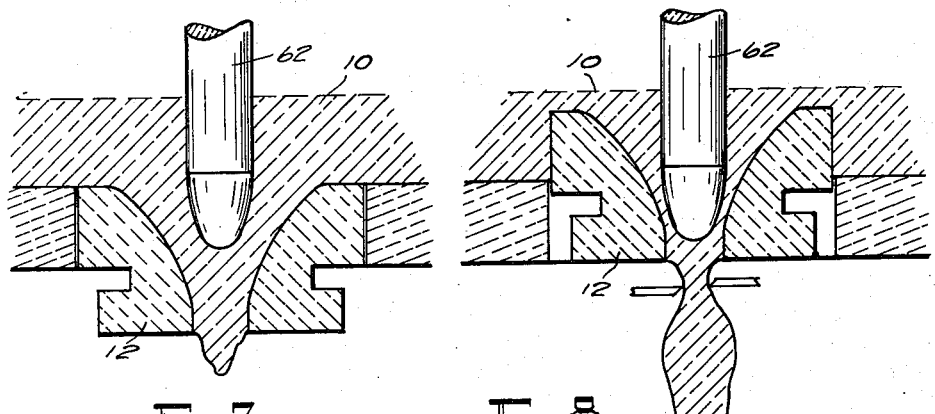
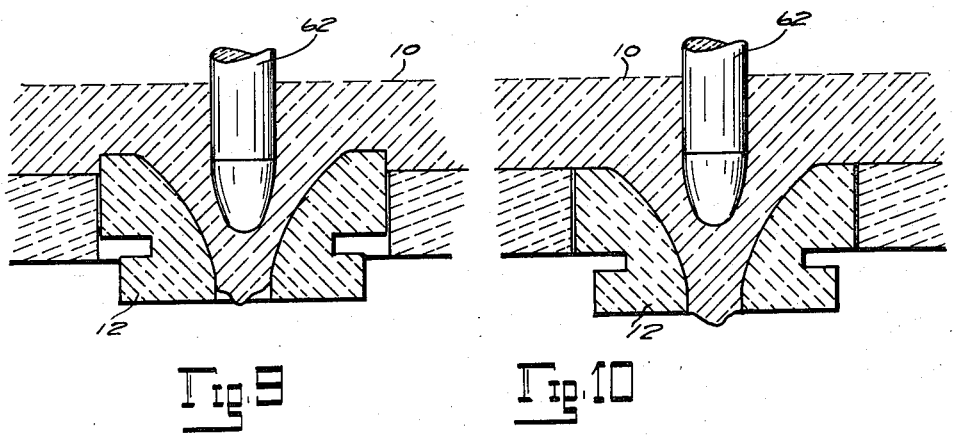
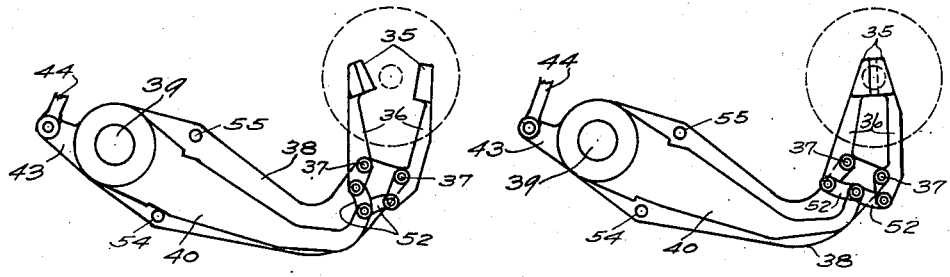

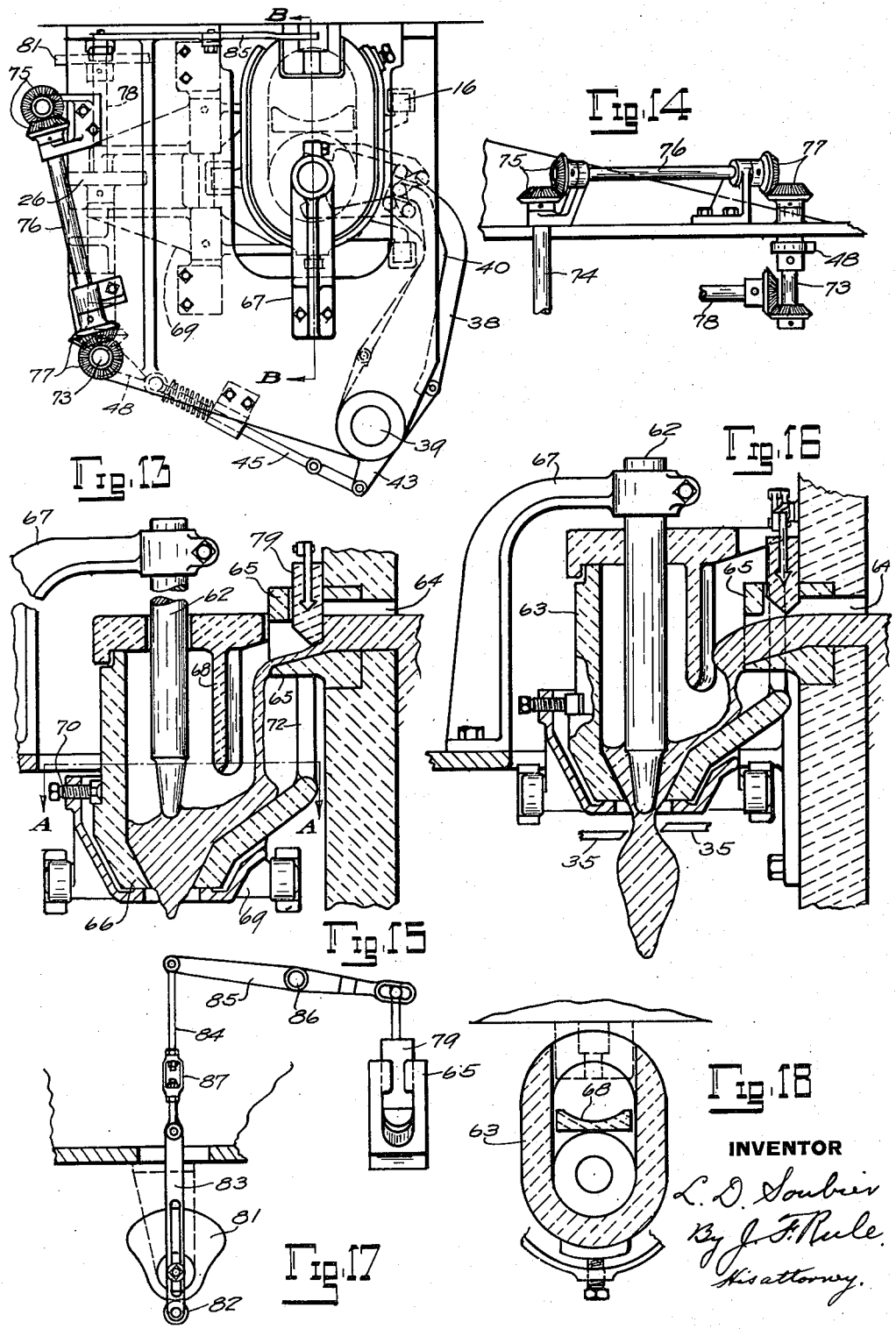

Patented Oct. 12, 1926.

1,603,160

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

MEANS FOR FORMING CHARGES OF MOLTEN GLASS.

Application filed June 1, 1920. Serial No. 385,591.

My invention relates to means for flowing or discharging molten glass from a container, regulating and controlling the discharge, and forming and separating the glass into individual masses or gobs of suitable size, shape and condition to form charges for the molds of a glass forming machine. An object of the invention is to provide improved means to so control and regulate the discharge that the glass is given the desired conformation as it issues from the container, without the use of extraneous forming means, and is, moreover, so controlled and supported that the discharge is intermittent and in timed relation to the movements of the molds.

In its preferred form, the invention comprises a container for the molten glass, having a spout in the bottom thereof through which the glass issues. The spout is reciprocated vertically. The upward movement of the spout tends to accelerate the movement of glass therethrough, while its downward movement tends to retard the flow. In combination with the spout, I preferably employ a mechanical regulator in the form of a stationary plug extending vertically downward through the glass into the spout. This regulator restricts the outlet opening and opposes any tendency of the glass to be carried upward with the spout as the latter rises, or in other words, pushes downward on the glass as the spout moves upward, so that the glass is forced through the outlet opening of the spout. As the spout moves downward the glass adhering to said regulator is held or prevented from moving freely downward with the spout. That is to say, the glass is temporarily supported by the regulator. Suitable cutting mechanism operates in synchronism with the movements of the spout to periodically sever the gobs of glass. The cutter may be so timed that it operates when the spout is in its upward position, or just after it has commenced its downward movement, at which time the complete charge or gob is depending from the spout.

Other features and advantages of the invention will appear hereinafter.

The present application discloses subject matter also disclosed in my co-pending applications, Serial Number 567,533, filed June 12, 1922, and Serial Number 690,408, filed February 4, 1924.

In the accompanying drawings:

Figure 1 is a front sectional elevation through a furnace extension or boot used in connection with my invention, the section being taken at the plane indicated by the line I—I on Figure 5.

Figure 2 is an elevation showing the gob forming and cutting apparatus.

Figure 3 is a section at the plane of the line III—III on Figure 1.

Figure 4 is a sectional plan view of the apparatus, the outline of the furnace boot being shown in broken lines.

Figure 5 is an elevation of the apparatus viewed in a direction at right angles to that of Figure 2.

Figure 6 is a fragmentary sectional elevation showing the spout or bushing in its elevated position.

Figures 7 to 10 are views illustrating the positions of the spout and shape of the glass at successive steps in the cycle of operations. Figure 7 shows the spout in its lowered position and the glass moving downward just before the spout commences to rise. Figure 8 shows the spout raised, the gob formed and the cutters operating to sever the gob. Figure 9 shows the spout descending and the glass being held or drawn upward relative to the spout by its adherence to the regulating plug. Figure 10 shows the position of the glass as the spout completes its downward movement.

Figures 11 and 12 are diagrammatic views of the cutting mechanism, Figure 11 showing the blades separated just after the cutting stroke, but before they have been withdrawn from beneath the spout. Figure 12 shows the blades brought together during the cutting stroke.

Figures 13 to 18 illustrate a modification in which the glass flows from the furnace into a separate container arranged to reciprocate vertically. Figure 13 is a plan view thereof. Figure 14 is a detail showing part of the driving mechanism. Figures 15 and 16 are sectional views with the parts in different positions, the section being at the plane indicated by the line B—B on Figure 13. Figure 15 shows the receptacle in its lowered position, and Figure 16 in its elevated position. Figure 17 is a detail view showing a valve gate and its operating mechanism. Figure 18 is a sectional plan view, the section being taken at the plane of the line A—A on Figure 15.

The glass 10 is contained in a receptacle or boot 11 which may be an extension of a glass melting or refining tank. A bushing or spout 12 is mounted to reciprocate vertically in an opening 13 extending through the floor of the boot 11, said spout being formed of clay or other refractory material. The spout 12 is carried on a metal frame 14, the spout being clamped to the frame by means of a ring 15 engaging an annular shoulder on the spout, the ring being bolted to the frame. The frame 14 is guided in its vertical movements by guiding blocks or posts 16 integral therewith, which slide vertically in stationary guiding brackets 17 bolted to the boot supporting frame 18. The spout 12 forms a receptacle or container having tapered walls terminating in the outlet orifice in the bottom thereof.

The carrier 14 is moved up and down by means of a rocking frame 20 having a rock shaft 21 journalled in brackets 22 bolted to the frame 18. The frame 20 comprises forwardly extending arms 23 having forked ends to receive lugs or rolls 24 on the frame 14. A cam engaging roll 25 on the rear end of the rocking frame 20 engages a cam 26 on a continuously rotating shaft 27. The shaft 27 is driven through bevel gears 28, 29 from a shaft 30 which is preferably geared to the glass forming machine carrying molds 31 which receive the charges of glass. The glass after entering the molds may be pressed and blown or otherwise manipulated, as will be understood by those versed in the art, to form bottles or other ware. It will be seen that each rotation of the cam carrying shaft 27 will rock the frame 20 and reciprocate the spout 12. The cam roll 25 is held against its cam by a spring 32 (Fig. 5).

Cutting mechanism periodically operated in timed relation to the movements of the spout, is provided for severing the charges of glass and permitting them to drop into the molds. The cutting mechanism comprises a pair of blades 35 carried at the outer ends of levers 36, the latter being pivoted at 37 to a horizontally disposed arm 38 mounted to swing horizontally about a pivot pin 39. A lever 40 for swinging the knife levers 36 about their pivots, is mounted to have a limited swinging movement about the pivot 39 independently of the arm 38. For this purpose the lever 40 is formed with a bearing sleeve 42 journalled on the pin 39. An arm 43 of the lever 40 is connected through a link 44 to a rod 45 (Fig. 4) slidable lengthwise in a stationary bearing 46. A cam engaging roll 47 on the outer end of said rod is held against a cam 48 by a spring 49. The cam 48 may be mounted on the vertical shaft 30. The forward end of the lever 40 is connected through a pivot pin 51 (Fig. 3) and toggle links 52 to the knife levers 36.

The operation of the cutter mechanism is as follows:

The cam 48 rotates continuously in the direction indicated by the arrow (Fig. 4). As the high part of the cam passes beyond the position shown in Figure 4 the rod 45 is permitted to move lengthwise under the influence of the spring 49, thereby first swinging the lever 40 outward about its pivot until arrested by a stop 54 on the arm 38. The movement of the lever 40 relative to said arm causes the pivot pin 51 to move rearwardly. During this movement to the Figure 12 position, the toggle links 52 are straightened and the cutters 35 brought together to sever the gob of glass by a shearing cut, it being understood that the arm 38 is at this time in the Figure 4 position. The blades 35 are immediately separated by the continued outward movement of the pivot pin 51. When the lever 40 reaches the Figure 11 position its movement independent of the arm 38 is arrested by the stop 54 so that the arm 38 now moves with said lever and carries the blades bodily outward away from the spout to a position in which they will not interfere with the vertical movements of the spout. When the cam 48 again approaches the Figure 4 position, the rod 45 is returned thereby to the Figure 4 position. During the initial portion of this return movement, the lever 40 swings inward independently of the arm 38 until arrested by a stop 55 on the arm 38. This movement of the lever returns the knife levers 36 and links 52 to the Figure 3 position. The continued movement of the rod 45 swings the arm 38 inward to the Figure 4 position.

The cutting operation is preferably timed to take place while the spout is in its uppermost position, or just after it has commenced its downward movement. The exact time for operating the cutters to secure the best results depends upon the temperature of the glass, the speed of the machine, size of charge desired, and other variable factors. The cam 26 is adjustable rotatively on its shaft and held in adjusted position by a set screw 60 (Fig. 4). This adjustment serves to adjust the timing of the cutting operation relative to the movements of the spout. The cam 48 is also preferably adjustable in like manner about its shaft.

The flow of glass is regulated and the formation of the gob controlled by a regulating device in the form of a stationary plug 62 which is supported above the glass in the boot and extends vertically downward into the glass with its lowered end projecting into the spout 12. This plug is of a size to partially restrict the flow opening in the spout, particularly when the latter is in its elevated position, but does not entirely close the opening. As the molten or plastic glass adheres to the plug it will be seen that during the downward movement of the spout the glass therein is retarded or prevented from moving downward freely with the spout. This is in effect an upward pull on the glass and serves to support the glass temporarily after a gob has been severed, and while the charged mold moves away and the succeeding mold is brought into charging position. By reference to Figure 9 it will be noted that the glass may be drawn up within the end of the spout as the latter moves downward. The holding effect of the plug on the glass decreases as the spout moves downward so that when the latter reaches its downward position (Fig. 10) the glass is again moving downward through the outlet. When the spout rises, the regulating plug acts as an ejector to push the glass outward in the form of a mass or gob which may assume the shape indicated in Figure 8. The downward movement of this gob pulling away from the glass in the mouth of the spout, forms a neck or restricted portion at the plane of the cutters. The initial downward movement of the spout may take place before the cutter operates, thereby further restricting the diameter of the glass at the cutting point, owing to the relative upward pull of the glass adhering to the plug. The operation of this glass feeder is such that the glass is extruded from the furnace in the form of gobs or masses of suitable shape for entering the molds, instead of being permitted to string out or run in a small stream. Also the regulator 62 serves to support the glass and temporarily stop the flow independent of any supporting means extraneous to the container.

Referring to the modification shown in Figures 13 to 18 inclusive, a container 63 is positioned adjacent the furnace and arranged to be reciprocated vertically and substantially in the same manner as the spout 12. The glass flows through an opening 64 in the side wall of the furnace and through a spout 65 in said opening, into the container 63. The lower end of the container is tapered and provided with an outlet opening, thereby forming a spout 66 through which the glass issues. The regulator 62 adjustably mounted in a stationary arm 67, extends downward into the receptacle 63. A wall or shield 68 extends downward from the top of the container between the regulator 62 and the spout 65 and protects the regulator from a one sided or uneven heat. The container 63 is moved up and down by means of a rocking frame 69 which is substantially the same in construction as the frame 20, except that it is suitably shaped to fit the container 63. The frame 69 is operated by the cam 26, the same as the frame 20. The container 63 is held in place in the rocking frame by a set screw 70 which permits said frame to tilt while the receptacle is guided vertically by the guiding blocks 16. The bushing 65 extends through a slot 72 in the wall of the container.

The cam 48 for operating the cutter is mounted on a vertical shaft 73 (Fig. 14) driven from a drive shaft 74 through mitre gears 75, horizontal shaft 76 and gears 77. The cam 26 for reciprocating the container 63 is mounted on a horizontal shaft 78 geared to the shaft 73.

A gate valve 79 controlling the flow of glass from the furnace to the container 63, is arranged to reciprocate vertically in the spout 65 in timed relation to the movements of the container 63. This valve is operated by a cam 81 on the shaft 78. A cam roll 82 running on said cam is carried at the lower end of a rod 83 connected through a link 84 to a lever 85 pivoted at 86 and connected to the valve 79. A turn buckle 87 permits adjustment of the valve and thus permits the amount of glass passing the valve at each operation to be accurately adjusted and controlled. At each operation of the valve a quantity of glass sufficient to form a mold charge is permitted to flow past the valve. The flow is not entirely interrupted by the downward movement of the valve. The relative movements of the valve and the container 63 are so timed that the mass of glass which passes through the spout 65 when the valve is lifted is permitted to enter the container while the latter is in its lowered position, so that as the container is moved upward the glass in the spout 66 is forced outward in the form of a gob, the operation being similar to that already explained in connection with Figures 7 to 10.

Various modifications other than herein shown may be resorted to without departing from the spirit and scope of my invention, and some portions may be used without others.

What I claim is:—

1. The combination of a container for molten glass having a restricted passageway terminating in an outlet orifice through which the glass is expelled, means to cause an intermittent discharge of glass through said orifice while the latter remains open, comprising a regulator within the glass, and means to cause a periodic movement of said orifice toward and from the regulator while the container remains stationary, the regulator being operable as the orifice moves toward it to force the glass outward and by the movement of the orifice from it to draw the glass inward.

2. The combination of a container for molten glass having a restricted passageway terminating in an outlet orifice through which the glass is expelled, means to cause an intermittent discharge of glass through said orifice while the latter remains open, comprising a regulator within the glass, means to cause a periodic movement of said orifice toward and from the regulator while the container remains stationary, the regulator being operable as the orifice moves toward it to force the glass outward and by the movement of the orifice from it to draw the glass inward, and severing means operable automatically in timed relation to said movements to sever the discharged glass.

3. The combination of a container for molten glass having a spout through which the glass is discharged, a regulating plug within the container and projecting into said spout, and means for reciprocating said spout while the plug and container remain stationary and thereby causing the outlet end thereof to move toward and from the plug while maintaining the spout continually open.

4. The combination of a receptacle to contain molten glass, said receptacle comprising a spout in the bottom thereof through which the glass is discharged, a plug projecting downward through the glass into said spout, and automatic means for causing a periodic relative vertical reciprocating movement of the spout within the bottom of the receptacle while maintaining said spout continually open.

5. The combination of a container for molten glass comprising a spout forming a passageway through which the glass is discharged, a stationary regulating device within the glass in the container, and means to reciprocate the spout toward and from said regulating device while the container remains stationary.

6. The combination of a stationary container for molten glass comprising a spout forming a passageway through which the glass is discharged, a stationary regulating device extending within the spout, and means to reciprocate the spout toward and from said regulating device.

7. The combination of a container for molten glass formed with an opening in the wall thereof, and a member mounted to reciprocate in said opening, said member being formed with a passageway therethrough for the discharge of glass.

8. The combination of a stationary container for molten glass, provided with a normally open spout in the bottom thereof through which the glass is discharged, and automatic means for reciprocating said spout vertically.

9. The combination of a container for molten glass, provided with a spout in the bottom thereof through which the glass is discharged, automatic means for reciprocating said spout vertically while the container remains stationary, and a regulating device cooperating with said spout to regulate the discharge of glass therethrough.

10. The combination of a stationary receptacle to contain molten glass, comprising a floor portion movable up and down and formed with a passageway therethrough for the discharge of glass, and automatic means for periodically moving said portion up and down.

11. The combination of a receptacle to contain molten glass, comprising a floor portion movable up and down and formed with a passageway therethrough for the discharge of glass, automatic means for periodically moving said portion up and down, a cutter, and means to project said cutter beneath said portion and sever the glass while said portion is in its elevated position and to withdraw the cutter to permit the downward movement of said portion.

12. The combination of a container for molten glass having an outlet opening in the bottom thereof, means for causing a periodic up and down movement of that portion of the container having said opening, a cutter, and means to project the cutter beneath said movable portion while in its upper position and sever the glass and then withdraw the cutter to permit said portion to move downward.

13. The combination of a furnace to contain molten glass, of a receptacle having tapered walls terminating in a bottom outlet orifice, means for causing a flow of glass from the furnace into said receptacle, a stationary regulating device projecting downward into the glass in said receptacle, and means to reciprocate said receptacle vertically.

14. The combination with a furnace to contain molten glass, of a receptacle having an outlet orifice, means for causing a flow of glass from the furnace into said receptacle, means to reciprocate said receptacle vertically, a valve controlling the flow of glass from the furnace into the receptacle, and automatic means to periodically actuate the valve in timed relation to the movements of the receptacle.

15. The combination of a furnace to contain molten glass, said furnace having an outlet opening in the side wall thereof through which the glass is discharged, a receptacle positioned to receive the glass as it is discharged from the furnace, means to reciprocate said receptacle vertically, said receptacle having a discharge opening in the bottom thereof, a stationary regulating plug projecting downwardly within the glass in said receptacle over said opening, a valve controlling the flow of glass from the furnace to said receptacle, and means to periodically actuate the valve.

16. The method of producing charges of molten glass, which consists in maintaining a continuous supply of molten glass in a container having an outlet in the bottom thereof, periodically moving said bottom toward and from the surface of the glass in the container, applying a resisting force to the glass above the outlet while said bottom moves up toward the surface of the glass and thereby exerting a downward expelling force on the issuing glass, and periodically severing the glass beneath the outlet.

17. The combination of a stationary container from which molten glass is extruded, a device in contact with the glass automatically moved upward periodically, and means co-operating with said device to cause such upward movement to apply an expelling force to the issuing glass.

18. The combination of a stationary container from which molten glass issues, a device in contact with the glass in the container, means to move said device up and down periodically, and means co-operating with said device to cause it during its upward movement to effect an expelling action on the issuing glass, and during its downward movement to retard the issuance of the glass.

19. The method of feeding mold charges from a body of molten glass, which consists in flowing the glass by gravity directly through a passage and through a discharge outlet communicating therewith, and controlling the shape of the glass below the outlet by movements of the surfaces forming the passageway.

20. The method of feeding mold charges from a body of molten glass, which consists in flowing the glass by gravity from the molten mass, into and through a passage within a movable member arranged to discharge through an outlet, and controlling the periodic discharge through the outlet by moving said member.

21. The method of feeding mold charges from a body of molten glass, which consists in flowing the glass by gravity through an internal flow passage of a movable member communicating with a discharge outlet, and controlling the shape of the charges formed below the outlet by moving said member periodically to modify the gravitational flow.

22. The method of feeding mold charges from a body of molten glass, which consists in flowing the glass by gravity into a compact cylindrical column disposed over a discharge outlet, and modifying the gravitational movement of the column through the outlet to control the shape of the charges below the outlet by forces applied to the cylindrical outer surface of the column.

23. The method of feeding mold charges from an outlet submerged below a body of molten glass, which consists in preshaping masses of the glass in a sequestered space in a rigid movable member above the outlet by gravitational movement of the glass in said space, and controlling the shape of the charges below the outlet by moving the said member to modify the gravitational movement therein.

24. The method of feeding mold charges from an outlet submerged below a body of molten glass, which consists in sequestering and pre-shaping masses of the glass in a rigid movable member above the outlet by gravitational flow of the glass thereto, while maintaining a constant flow area between the body of the glass and said space, and controlling the shape of the charges below the outlet by movements of said member, operating to extrude the glass by modifying its gravitational movement in and below the sequestered space.

25. In apparatus for segregating mold charges from a body of molten glass, the combination with a container for the glass provided with a discharge outlet, of a member having a flow passage into and through which the glass can flow by gravity to the outlet, and means for moving said member to modify the gravitational flow therethrough.

26. An apparatus for segregating mold charges from a body of molten glass, comprising in combination with a glass container, a member operable within the container and having an internal flow passage for the glass to regulate its discharge from the container, means adapted to be moved to vary the resistance to the flow of glass in said passage, and means for moving said member with respect to the container to modify the flow through said flow passage.

27. In an apparatus for segregating mold charges from a body of molten glass, the combination of a glass container having an opening, of an internal flow plunger fitting in the wall surrounding said opening closely enough to prevent appreciable discharge of glass past the outside of the plunger, means for regulating the resistance to flow through the plunger, and means for reciprocating the plunger relatively to the container.

28. In apparatus for segregating mold charges from a body of molten glass, the combination with a glass container provided with a discharge outlet, of a member operable within the container and having an internal flow passage for the glass to the outlet, means adjustable to vary the resistance to the flow of glass in said passage, and means for moving said member with respect to the container to modify the flow therethrough.

29. In apparatus for segregating mold charges from a body of molten glass, the combination with a glass container provided with a discharge outlet, of a member operable within the container and having an internal flow passage for the glass to the outlet, means positioned within said member and adjustable to vary the resistance to the flow of glass therein, and means for moving said member back and forth with respect to the container to modify the flow through said flow passage.

30. In apparatus for segregating mold charges from a body of molten glass, the combination with a glass container provided with a discharge outlet, of a member operable within the container and having an internal flow passage for the glass to the outlet, means for regulating the size of the outlet end of said passage, and means for moving said member back and forth in the glass over the outlet.

31. In apparatus for segregating mold charges from a body of molten glass, the combination of a glass container provided with a well, of an internal flow plunger fitting in the well closely enough to prevent appreciable discharge of glass past the outside of the plunger, means for regulating the resistance to flow through the plunger, and means for reciprocating the plunger within said well.

32. In apparatus for segregating mold charges from a body of molten glass, the combination with a container for the glass having a discharge outlet, of a plunger adjacent to the outlet movable with respect to the container and provided with an internal passage for the flow of glass from the container to its outlet, and arranged to prevent appreciable flow of the glass to the outlet except through said internal passage.

Signed at Toledo, in the county of Lucas and State of Ohio, this 27th day of May, 1920.

LEONARD D. SOUBIER.